United States Patent [19]

Fowler et al.

[11] Patent Number: 4,688,862
[45] Date of Patent: Aug. 25, 1987

[54] WORKSTATION FOR ELECTRONIC EQUIPMENT OPERATOR

[75] Inventors: David K. Fowler, Aurora; Margaret Karadimas, Darien; Ronald DeSimone, Orland Park; Frank J. Termini, Elgin, all of Ill.

[73] Assignee: Marvel Metal Products Company, Chicago, Ill.

[21] Appl. No.: 730,294

[22] Filed: May 3, 1985

[51] Int. Cl.⁴ .................................. A47B 21/00
[52] U.S. Cl. ............................ 312/325; 248/118.3; 248/118.5; 312/196; 312/208; 400/715
[58] Field of Search ........... 312/208, 279, 196, 27, 312/24, 30, 325; 248/1 A, 1 B, 1 C, 1 E, 1 F, 1 H, 1 I, 1 J, 118, 118.1, 118.3, 118.5; 400/715; 108/20

[56] References Cited

U.S. PATENT DOCUMENTS

| 432,786 | 7/1890 | Brandt | 248/118.3 |
|---|---|---|---|
| 467,991 | 2/1892 | Frederick | 248/118.3 X |
| 948,377 | 2/1910 | Prouty | 312/196 X |
| 1,162,146 | 11/1915 | Dulgeroff | 312/325 X |
| 2,046,395 | 7/1936 | Manoilovich et al. | 312/325 X |
| 2,950,890 | 8/1960 | Hough, Jr. | 248/118 |
| 4,201,427 | 5/1980 | Orr | 312/30 X |
| 4,379,429 | 4/1983 | Gubbe et al. | 248/1 B X |
| 4,384,532 | 5/1983 | Staff | 312/27 X |
| 4,453,687 | 6/1984 | Sweere | 248/1 F X |
| 4,481,556 | 11/1984 | Berke et al. | 248/118 X |
| 4,515,086 | 5/1985 | Kwiecinski et al. | 312/196 X |

FOREIGN PATENT DOCUMENTS

| 1913287 | 9/1970 | Fed. Rep. of Germany | 400/715 |
|---|---|---|---|
| 1957318 | 5/1971 | Fed. Rep. of Germany | 312/208 |
| 2203265 | 8/1973 | Fed. Rep. of Germany | 400/715 |
| 2518942 | 11/1976 | Fed. Rep. of Germany | 312/208 |
| 2910855 | 10/1980 | Fed. Rep. of Germany | 400/715 |

*Primary Examiner*—Kenneth J. Dorner
*Assistant Examiner*—Thomas A. Rendos
*Attorney, Agent, or Firm*—Wallenstein, Wagner, Hattis, Strampel & Aubel, Ltd.

[57] ABSTRACT

A workstation or terminal table utility for use with electronic information devices. The workstation incorporates selectively adjustable means for enabling an operator to most effectively and efficiently use the devices supported on the workstation while at the same time minimizing muscle fatigue and strain during operation of the devices.

3 Claims, 19 Drawing Figures

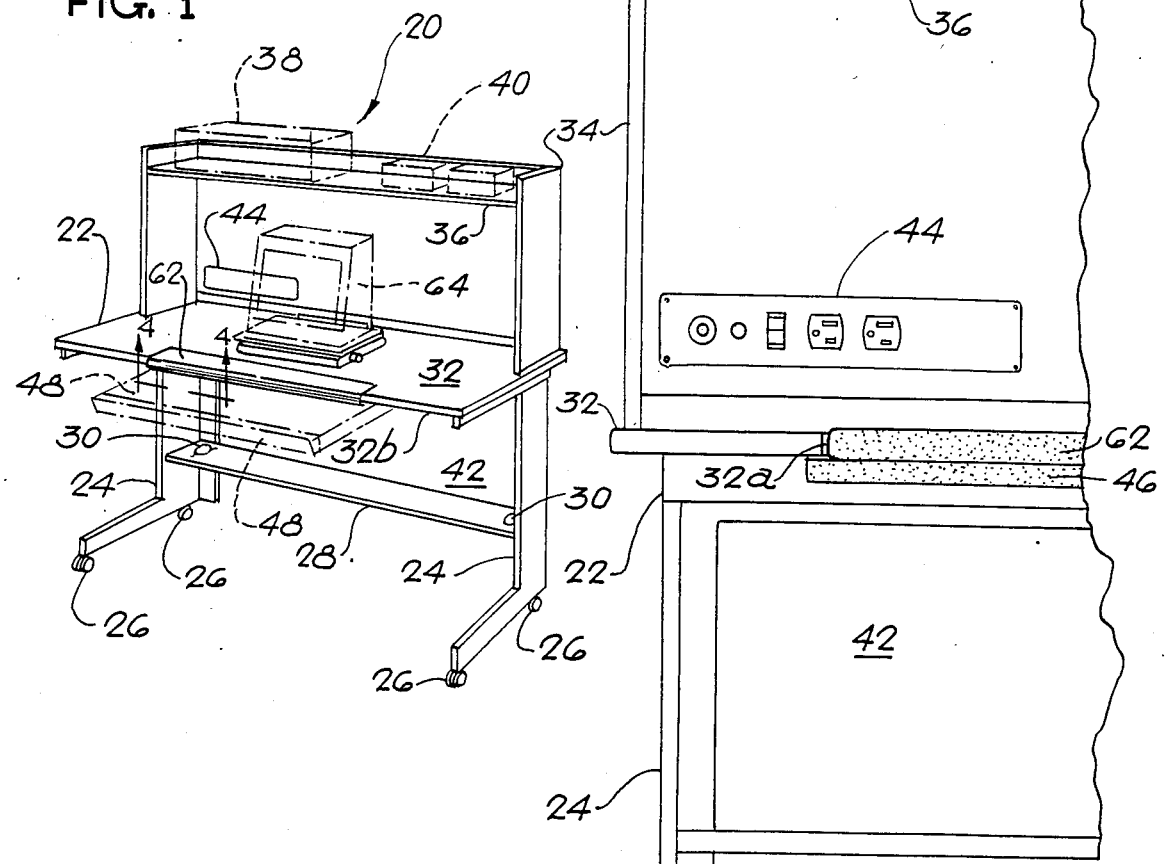
FIG. 1
FIG. 2
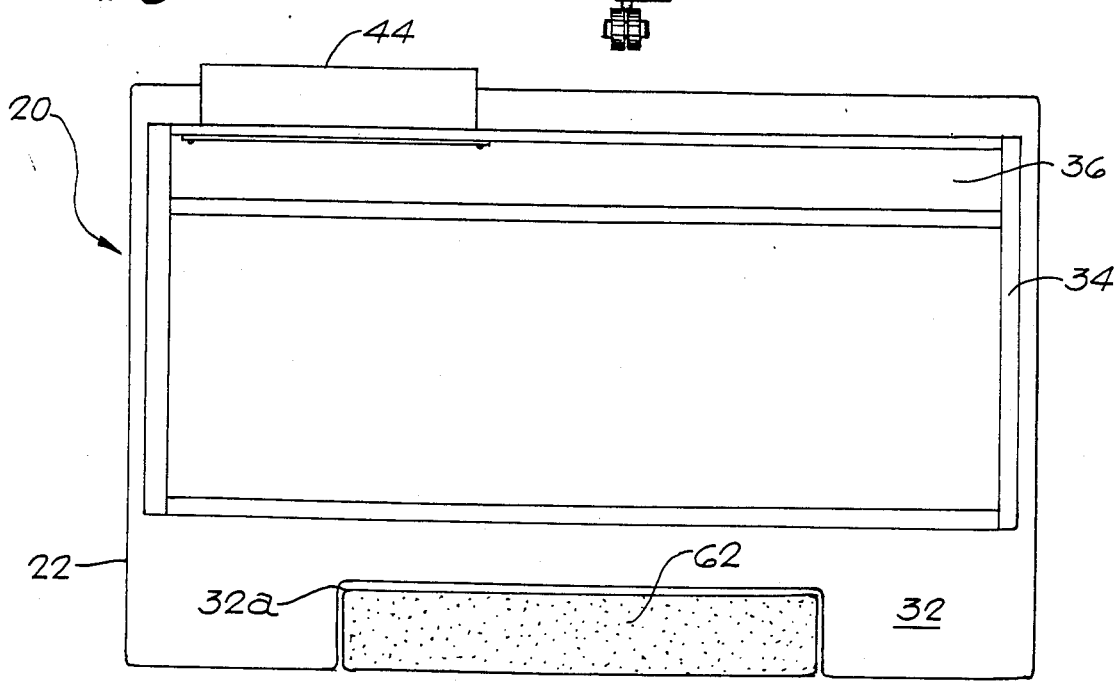
FIG. 3

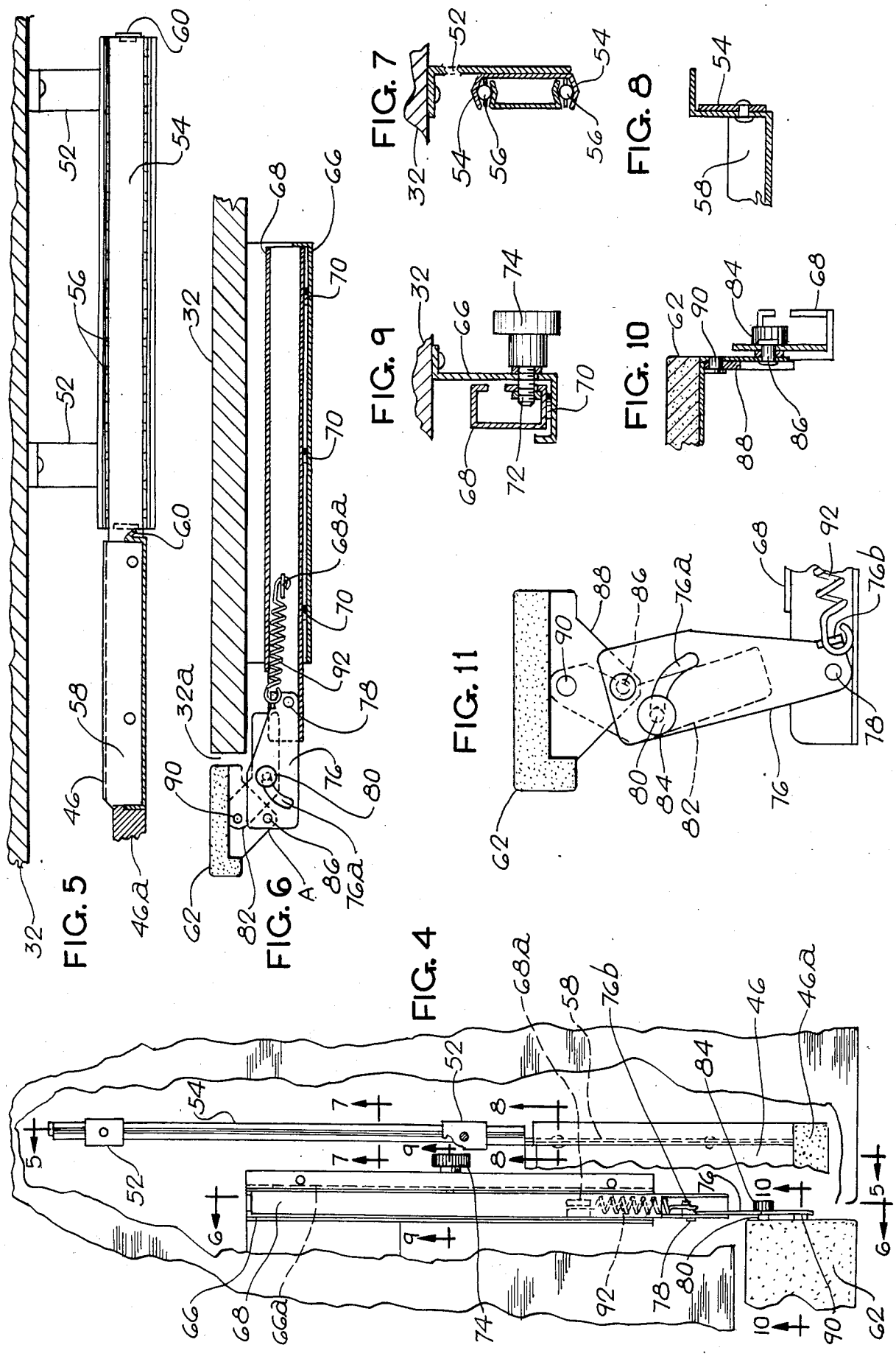

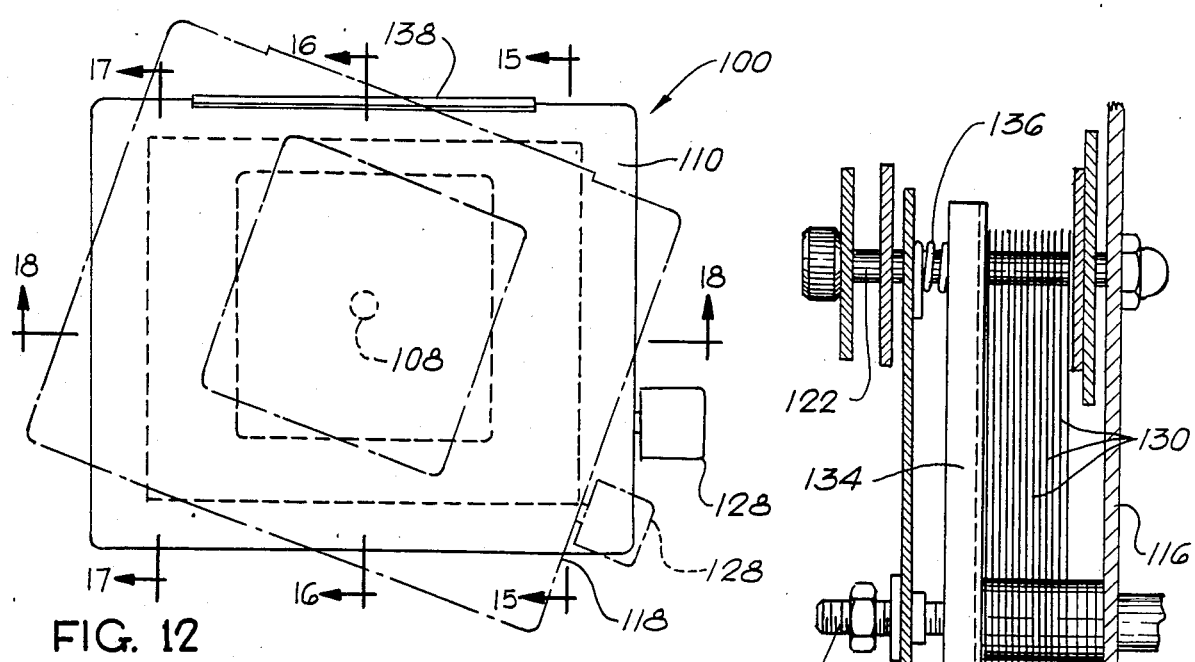
FIG. 12
FIG. 19
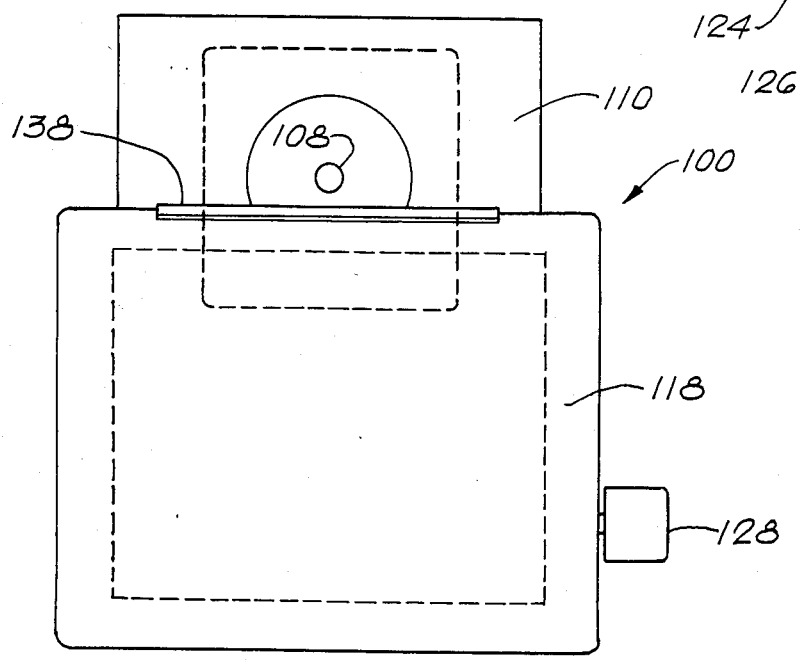
FIG. 13
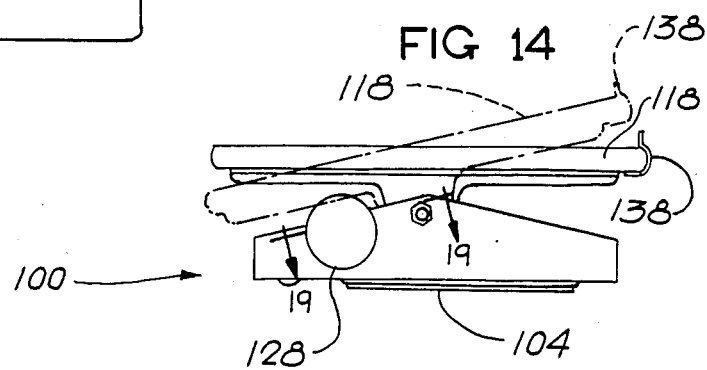
FIG. 14

WORKSTATION FOR ELECTRONIC EQUIPMENT OPERATOR

TECHNICAL FIELD

The present invention relates to an article of furniture and, in particular, to an article of furniture especially adapted for use as a workstation or terminal table for electronic information devices.

BACKGROUND OF THE PRIOR ART

Widespread attention has been directed to the development of furniture for supporting electronic devices or machines of the type which have come into common use in business and professional offices. The term "ergonomics" has become the byword of developers of such furniture, and the furniture itself is generically referred to as a "terminal table". The furniture comprises single-surface terminal tables, split-level terminal tables, and adjustable terminal tables, the latter generally including a shelf which can be adjusted vertically with relation to the main support surface of the table. While one of the aims of developers of such specialized furniture is to adapt the terminal tables to meet the needs of operators of the machines for which the tables are fabricated, they heretofore have fallen short of this goal, especially from the standpoint of combatting operator fatique and muscle strain during high intensity, long-duration operation of the electronic equipment supported on a terminal table. More specifically in this connection, conventional terminal tables do not provide proper or adequate support for the hands and arms of an operator, a critical consideration, particularly in situations where the operator is entering or deleting data by means of a touch video screen, for example. Conventional terminal tables further fail to provide proper or adequate means for enabling an operator to make adjustments of device-support surfaces which will permit better operator visibility of equipment such as monitors, central processing units, laser video disk players, or the like, and/or adjustments to enable an operator to position equipment in relation to his or her body to optimize equipment accessibility and maximize operator comfort.

BRIEF DESCRIPTION OF THE INVENTION

In accordance with the present invention, a workstation or terminal table has been evolved which enables an operator to make easily-performed adjustments of equipment-supporting surfaces, thereby permitting the operator to orient the equipment resting on those surfaces in a way which promotes, enhances and augments the most effective use of the equipment while placing minimal physical demands on the operator. In addition to its versatility from the standpoint of its support-surface adjustability, the workstation or terminal table of this invention provides adjustable means for supporting the arms, elbows and hands of an operator in positions which minimize muscle fatigue and strain, while at the same time permitting total and efficient operation of equipment on the terminal table. The workstation or terminal table further is provided with drawer means for a low-profile keyboard of the type used with a word processor or data processor. The drawer means enables an operator to easily move the keyboard to a hidden position under the terminal table during periods of non-use, thereby permitting unobstructed use of other equipment on the table.

The foregoing, and other features and advantages of the present invention will become more apparent from the description to follow, taken in conjunction with the accompanying drawings.

BRIEF DESCRIPTION OF THE DRAWINGS

FIG. 1 is a view in perspective of an embodiment of the workstation of the present invention with electronic information devices ghosted in on support surfaces thereof;

FIG. 2 is a partial view in elevation of the front of said embodiment;

FIG. 3 is a top plan view of said embodiment;

FIG. 4 is a fragmentary view taken substantially along line 4—4 of FIG. 1;

FIG. 5 is a fragmentary view taken substantially along line 5—5 of FIG. 4;

FIG. 6 is a vertical sectional view taken substantially along line 6—6 of FIG. 4;

FIG. 7 is a vertical sectional view taken substantially along line 7—7 of FIG. 4;

FIG. 8 is a vertical sectional view taken substantially along line 8—8 of FIG. 4;

FIG. 9 is a vertical sectional view taken substantially along line 9—9 of FIG. 4;

FIG. 10 is a vertical sectional view taken substantially along line 10—10 of FIG. 4;

FIG. 11 is a fragmentary side view in elevation of the mechanism of the adjustable arm and/or hand support means;

FIG. 12 is a top plan view of the auxiliary support unit of said embodiment of the invention;

FIG. 13 is a top plan view of the unit shown in FIG. 12 in its extended position;

FIG. 14 is an end view of the unit shown in FIG. 12 illustrating the support platform of the unit in a tilted and non-tilted position;

FIG. 19 is a sectional view taken substantially along line 19—19 of FIG. 14.

DETAILED DESCRIPTION OF THE INVENTION

Figure 15:
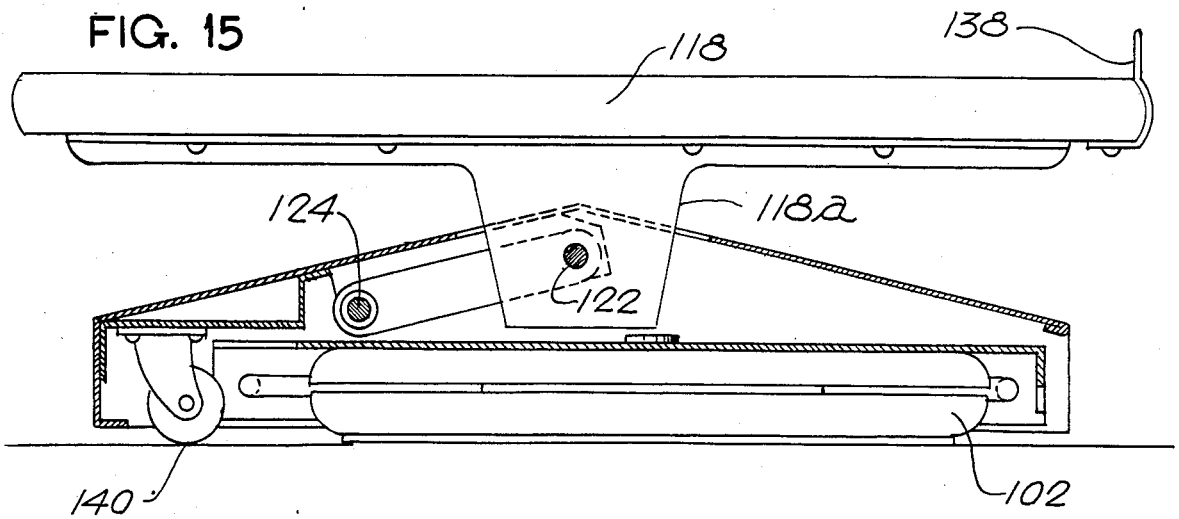
FIG. 15 is a vertical sectional view taken substantially along line 15—15 of FIG. 12.

Referring, in particular, to FIGS. 1, 2 and 3 of the drawings, the embodiment of the invention illustrated, and designated generally by reference numeral 20, comprises a main support member 22 having legs 24—24. The base of each leg advantageously is provided with a pair of casters 26—26. A convenience shelf 28 extends between the legs 24—24, and desirably is provided with openings 30—30 at the ends thereof for accommodating electrical cords connected to electronic information devices supported on the member 22. A top panel or table top 32 is mounted on the upper ends of the legs 24—24, and an enclosure or carrel 34 advantageously is secured to the upper surface of the table top 32. As illustrated, the carrel 34 includes a vertically adjustable shelf 36 for supporting electronic equipment such as, for example, a central processing unit 38 and a laser disc player 40. A modesty panel 42 is provided at the rear of the member 22, and, as best shown in FIG. 2, a power strip 44 is mounted on the rear wall of the carrel 34.

In the preferred embodiment of the invention shown, the member 22 has a sliding drawer 46 mounted to the undersurface of the table top 32. The drawer 46 has a relatively shallow compartment 48 adapted to receive a low-profile keyboard (not shown) of the type used in conjunction with a word or data processor (not shown). The drawer 46 is mounted to the undersurface of the table top 32 by means of brackets 52—52 (see FIGS. 4 and 5) to which are attached a raceway 54 provided with ball bearings 56. The raceway 54 guides runners 58 carried on each side of the drawer 6. Stops 60—60 are provided at each end of the raceway 54 to limit the rearward and forward movement of the drawer 46 by an operator. The leading or front edge 46a desirably is padded and serves as a palm rest for an operator of the keyboard carried in the drawer 46.

The member 22, in the preferred embodiment of the invention illustrated, advantageously is provided with an adjustable arm and/or hand rest member or pad 62 which is received in a recess 32a formed in the leading or front margin 32b of the table top 32. The pad 62 desirably is upholstered to provide a comfortable, yet firm, surface on which an operator can support his or her arm, elbow or hand while using an electronic information device such as a touch video screen 64 (see FIG. 1). The pad 62 can be selectively adjusted upwardly and downwardly, as well as inwardly and outwardly, to place it in a position which is most suited to the physical make-up of the operator, while at the same time enabling the most efficient and effective use of an electronic information device supported on the member 22.

As best shown in FIGS. 4, 6, 9, 10 and 11 of the drawings, the pad 62 is mounted on the table top 32 by a pair of brackets 66—66 secured to the undersurface of the top 32. The brackets 66—66 are each provided with a travel slot 66a formed in the vertical leg thereof. The brackets 66—66 receive runners 68—68 which ride on plastic buttons 70 secured to the inner surface of the horizontal leg of the brackets 66—66. Each of the runners 68—68 carries an externally threaded stud 72 which extends through the travel slot 66a in the vertical leg of the brackets 66—66. A locking knob 74 is secured on the outer end of each threaded stud 72. By means of the knob 74, an operator can control the extent of the forward or rearward movement of the pad 62.

The leading end of each of the runners 68—68 has a plate member 76 pivotably secured to it by a pivot pin 78. Each plate member 76 is provided with an arcuate slot 76a through which extends an externally threaded stud 80 carried on a dog-leg shaped arm member 82. A locking knob 84 is secured on the outer end of the stud 80 for enabling an operator to adjust the height and the forward or rearward orientation of the pad 62. The upper end of each plate member 76 is pivotably mounted on a pivot pin 86 which is carried on a bracketd 88 at each end of the pad 62. The arm member 82, at its upper end also is pivotably secured to the bracket 88 by a pin 90. In order to facilitate the retraction and extension, as well as the adjustment of the pad 62, a compression spring 92 is secured at one of its ends to an extension 76b struck from the lower end of the plate member 76, and at its other end to an extension 68a provided on the inner wall of the runners 68—68.

Figure 18:
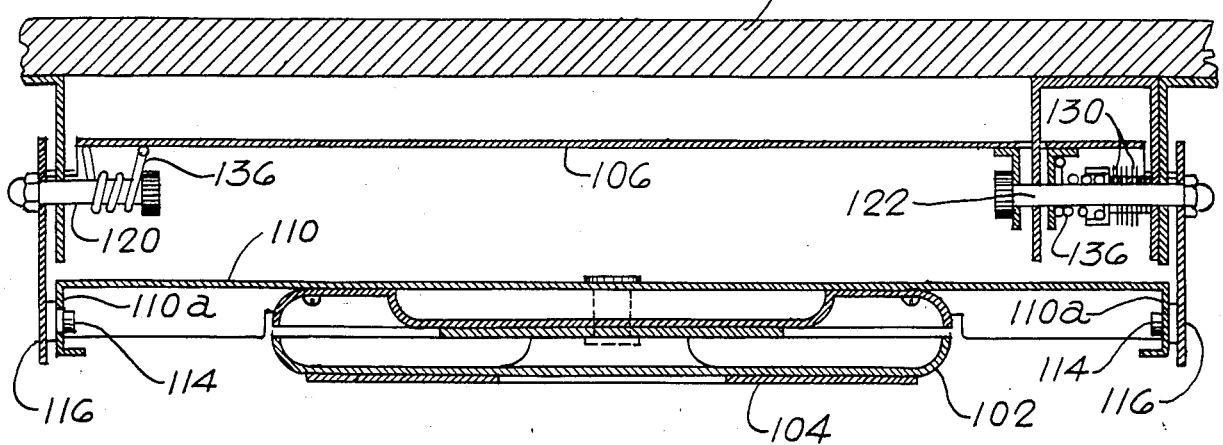
FIG. 18 is a vertical sectional view taken substantially along line 18—18 of FIG. 12.

The versatility of the workstation of the present invention is augmented by utilizing an auxiliary support unit for electronic information devices to be used by an operator. A particularly suitable auxiliary support unit for such purposes is the unit sold under the designation "MULTI-MODE" (Marvel Metal Products, Inc. of Chicago, Ill.). The embodiment of the units shown, and designated generally rotated, tilted, and moved forwardly or rearwardly, as required by an operator. As best illustrated in FIGS. 12 through 14 of the drawings, the unit 100 is shown in a rotated position (FIG. 12), a forward extended position (FIG. 13), and a tilted position (FIG. 14). The unit 100, as shown, comprises a pedestal 102 to the base of which is attached a friction pad 104 for preventing inadvertent movement of the unit 100 when it is positioned on the workstand 10 as depicted in FIG. 1 of the drawings. The pedestal 102 is connected to a turntable 106 by means of a spindle or pin 108. The turntable 106 comprises a base member 110 having sidewalls 110a—110a provided with travel slots 112 for limiting the forward and rearward linear movement of the turntable 106. Studs 114, secured to the inner wall of side plates 116—116, are received in and ride along the slots 112. A support platform 118 having a truncated extension 118a on opposite sides thereof is pivotably secured to the side plates 116—116 by pivot pins 120 and 122. The selectively controlled tilt mechanism of the unit 100, as best illustrated in FIGS. 18 and 19, comprises an externally threaded pin 124 supported at one end by a bracket 126. The bracket 126 also supports the inner end of the pivot pin 122. The outer end of the pin 124 extends through side plate 116 where an internally threaded locking knob 128 is secured thereto. A plurality of pressure plates 130 are carried on the pins 122 and 124, and are maintained in spaced relation to one another by washers 132. The plates 130 are urged in the direction of a bracket 134 when the locking knob 128 is tightened on the pin 124. A pair of torsion springs 136—136 are positioned on the pins 120 and 122. The springs 136—136 act to tilt the platform 118 of the turntable rearwardly when the knob 128 is loosened. A stop 138 is provided along the rear margin of the platform 118 to prevent an electronic information device such as touch screen video 64 from sliding off the platform 118 when the platform is tilted rearwardly by the action of the tension springs 136—136.

Figure 16:
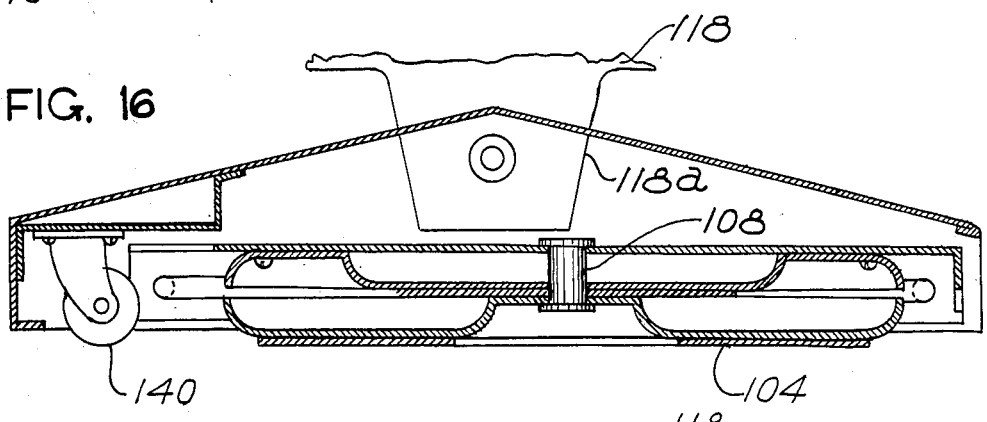
FIG. 16 is a vertical sectional view taken substantially along line 16—16 of FIG. 12.
Figure 17:
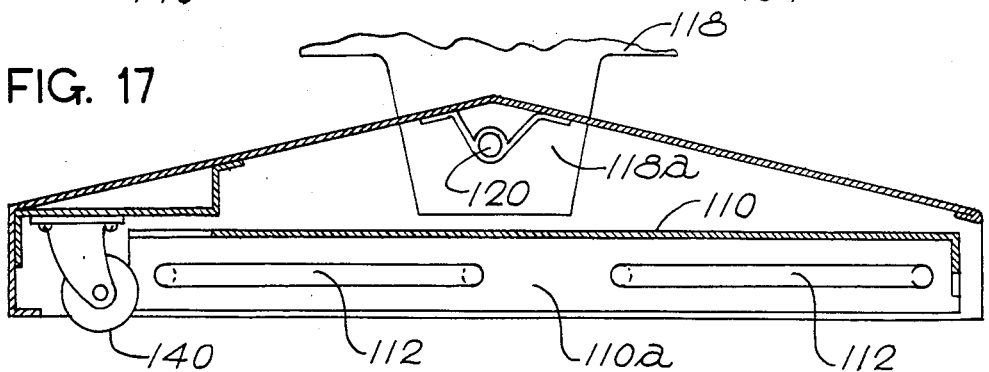
FIG. 17 is a vertical sectional view taken substantially along line 17—17 of FIG. 12.

The unit 100, as shown in FIGS. 15-17, advantageously is provided with casters 140 to facilitate linear movement of the turntable along the travel slots formed in the sidewalls of the base of the turntable.

While the present invention has been illustrated and described with relation to a specific embodiment, it should be understood that such showing and description have been given by way of illustration, and not by way of limitation.

We claim:

1. A workstation for use as a word or data processing center, a microfilm center, a CRT terminal table, or the like electronic information device, comprising: a main support member having a top panel for supporting an electronic information device in an operable position on the main support member; movable arm support means positioned in a recess formed along margin of the main support member; bracket means depending from the ends of the arm support means; a pair of arm members each pivotally connected to said bracket means; a pair of plate members pivotally connected to said bracket means, said plate members being provided with an arcuate slot; first releasable locking means carried on said plate members and connected through said arcuate slot in the plate members to said arm members, said first locking means and said arcuate slot cooperating to enable the arm support means to be selectively positioned above the top panel in spaced relation to an electronic information device supported on said top panel; a pair of horizontally disposed channel members positioned below said top panel; slidable runners carried on said channel members and movable in a horizontal plane along said channel members, the forward end of the slidable runners being pivotally connected to said plate members to enable the arm support means to be moved out of said recess when the slidable runners are moved toward the operator; biasing means connected to the slidable runners and to said plate members to facilitate the return of the arm support means to its normal position in said recess when the arm support means is not in use; and second releasable locking means provided for said slidable runners for selectively maintaining the arm support means in a desired position with relation to the top panel and an operator of an electronic information device supported on the top panel of the workstation.

2. A workstation according to claim 1 wherein the channel members are secured to the top panel of the main support member, said channel members being provided with longitudinally extending slots which in cooperation with said second releasable locking means limit the forward and rearward travel of the slidable runners.

3. A workstation for use as a word or data processing center, a CRT terminal table, a microfilm center, or the like electronic information device, comprising: a main support member having a top panel for supporting an electronic information device in an operable position on the main support member; a carrel secured on said top panel, said carrel being provided with shelf means for supporting electronic information components in a position where they are easily viewable by an operator; an auxiliary support unit positioned on said top panel, said auxiliary support unit being both rotatable and tiltable to enable an operator of an electronic information device supported thereon to adjust the orientation of the device as needed for effective operation; a drawer for the main support member for receiving a keyboard of the type used in conjunction with electronic information devices, said drawer being movable to a hidden position under said top panel when the keyboard is not in use; arm support means positioned in a recess formed along a margin of the main support member and above said drawer; bracket means depending from the ends of the arm support means; a pair of arm members each pivotally connected to said bracket means; a pair of plate members pivotally connected to said bracket means, said plate members being provided with an arcuate slot; first releasable locking means carried on said plate members and connected through said arcuate slot in the plate members to said arm members, said first locking means and said arcuate slot cooperating to enable the arm support means to be selectively positioned above the top panel in spaced relation to an electronic information device supported on said top panel; a pair of horizontally disposed channel members positioned below said top panel; slidable runners carried on said channel members and movable in a horizontal plate along said channel members, the forward end of the slidable runners being pivotally connected to said plate members to enable the arm support means to be moved out of said recess when the slidable runners are moved toward the operator; biasing means connected to the slidable runners and to said plate members to facilitate the return of the arm support means to its normal position in said recess when the arm suport means is not in use; and second releasable locking means provided for said slidable runners for selectively maintaining the arm support means in a desired position with relation to the top panel and an operator of an electronic information device supported on the top panel of the workstation.

* * * * *